(12) United States Patent
Schoor et al.

(10) Patent No.: US 9,910,150 B2
(45) Date of Patent: Mar. 6, 2018

(54) METHOD, ANTENNA ARRAY, RADAR SYSTEM AND VEHICLE

(71) Applicant: Robert Bosch GmbH, Stuttgart (DE)

(72) Inventors: Michael Schoor, Stuttgart (DE); Goetz Kuehnle, Hemmingen (DE); Volker Gross, Ditzingen (DE); Benedikt Loesch, Stuttgart (DE)

(73) Assignee: ROBERT BOSCH GMBH (DE)

( * ) Notice: Subject to any disclaimer, the term of this patent is extended or adjusted under 35 U.S.C. 154(b) by 530 days.

(21) Appl. No.: 14/598,857

(22) Filed: Jan. 16, 2015

(65) Prior Publication Data
US 2015/0198705 A1    Jul. 16, 2015

(30) Foreign Application Priority Data

Jan. 16, 2014 (DE) .................. 10 2014 200 692

(51) Int. Cl.
*G01S 13/93* (2006.01)
*H01Q 25/00* (2006.01)
*G01S 13/42* (2006.01)
*H01Q 1/32* (2006.01)
*H01Q 21/29* (2006.01)

(52) U.S. Cl.
CPC .......... *G01S 13/931* (2013.01); *G01S 13/424* (2013.01); *H01Q 1/3233* (2013.01); *H01Q 21/29* (2013.01); *H01Q 25/00* (2013.01); *G01S 2013/9375* (2013.01)

(58) Field of Classification Search
CPC .... H01Q 1/3233; H01Q 9/0407; H01Q 21/29; H01Q 25/00; G01Q 21/06; G01Q 21/065; G01S 13/931; G01S 13/42; G01S 13/424

USPC .............................................. 342/70–72, 147
See application file for complete search history.

(56) References Cited

U.S. PATENT DOCUMENTS

| | | | | |
|---|---|---|---|---|
| 5,008,678 A | * | 4/1991 | Herman | G01S 7/032 342/158 |
| 5,043,738 A | * | 8/1991 | Shapiro | H01Q 21/065 343/700 MS |
| 5,574,426 A | * | 11/1996 | Shisgal | B60Q 9/007 180/271 |
| 5,598,163 A | * | 1/1997 | Cornic | G01S 13/426 342/107 |

(Continued)

*Primary Examiner* — Peter M Bythrow
(74) *Attorney, Agent, or Firm* — Norton Rose Fulbright US LLP; Gerard Messina

(57) ABSTRACT

A method is provided for detecting at least two objects, particularly using a radar system having the steps of sending out a first radio signal using a first sending device, the first sending device being situated in a horizontal plane having at least two first antenna elements, receiving the radio signal using the at least two first antenna elements, receiving the radio signal using at least two second antenna elements, which are situated in different horizontal positions each above or below corresponding first antenna elements of the horizontally situated antenna elements, calculating respectively one azimuth angle and one angle of elevation from at least two objects located in front of the first antenna elements and the second antenna elements from the first radio signal received by the first antenna elements and from the first radio signal received by the second antenna elements. Furthermore, an antenna array, a radar system, and a vehicle are provided.

16 Claims, 8 Drawing Sheets

(56) References Cited

U.S. PATENT DOCUMENTS

| | | | | |
|---|---|---|---|---|
| 5,657,024 A * | 8/1997 | Shingyoji | G01S 7/032 | 342/175 |
| 5,717,399 A * | 2/1998 | Urabe | G01S 13/931 | 342/70 |
| 5,774,690 A * | 6/1998 | O'Neill | G06N 3/126 | 367/13 |
| 5,933,109 A * | 8/1999 | Tohya | G01S 7/023 | 342/175 |
| 6,351,243 B1 * | 2/2002 | Derneryd | H01Q 1/246 | 343/700 MS |
| 6,734,807 B2 * | 5/2004 | King | G01S 7/026 | 340/435 |
| 6,995,730 B2 * | 2/2006 | Pleva | G01S 7/032 | 343/853 |
| 7,609,198 B2 * | 10/2009 | Chang | G01S 13/89 | 342/179 |
| 9,638,795 B2 * | 5/2017 | Ahmed | G01S 13/89 | |
| 2002/0147534 A1 * | 10/2002 | Delcheccolo | B60K 31/0008 | 701/45 |
| 2004/0041732 A1 * | 3/2004 | Aikawa | H01Q 9/0457 | 343/700 MS |
| 2005/0225481 A1 * | 10/2005 | Bonthron | G01S 7/032 | 342/175 |
| 2007/0285315 A1 * | 12/2007 | Davis | G01S 3/74 | 342/377 |
| 2008/0088499 A1 * | 4/2008 | Bonthron | G01S 13/931 | 342/104 |
| 2008/0258964 A1 * | 10/2008 | Schoeberl | G01S 7/032 | 342/189 |
| 2009/0015509 A1 * | 1/2009 | Gottwald | H01Q 1/3233 | 343/878 |
| 2012/0223852 A1 * | 9/2012 | Gross | G01S 13/931 | 342/70 |
| 2012/0256795 A1 * | 10/2012 | Tajima | G01S 7/032 | 343/700 MS |
| 2012/0299773 A1 * | 11/2012 | Stirling-Gallacher | G01S 13/89 | 342/368 |
| 2013/0234881 A1 * | 9/2013 | Binzer | G01S 13/931 | 342/70 |
| 2013/0338912 A1 * | 12/2013 | Binzer | G01S 13/931 | 701/300 |
| 2014/0247182 A1 * | 9/2014 | Ahmed | H01Q 3/267 | 342/174 |
| 2016/0036131 A1 * | 2/2016 | Kim | H01Q 13/18 | 343/771 |

* cited by examiner

METHOD, ANTENNA ARRAY, RADAR SYSTEM AND VEHICLE

FIELD OF THE INVENTION

The present invention relates to a method, an antenna array, particularly for a radar system, a radar system and a vehicle.

BACKGROUND INFORMATION

Even though the present invention is described below in connection with radar systems for vehicles, it is not limited to this and may be used with any radar system.

In modern vehicles, a multiplicity of electronic systems is used, for example, if they are able to support the driver in his guidance of the vehicle. Braking assistants, for instance, are able to detect preceding traffic participants and to brake and accelerate the vehicle accordingly, so that a specified minimum distance is always maintained from the preceding traffic participants. Such braking assistants are also able to initiate emergency braking, when they detect that the distance from the preceding traffic participant is becoming too small.

In order to be able to provide such assistance systems in a vehicle, it is necessary to record data about the surroundings of the respective vehicle. In the above example of a braking assistant, it is required, for instance, to record the position of a preceding traffic participant, in order to be able to calculate the distance of one's vehicle from the preceding traffic participant.

In the detection of the position of a preceding traffic participant, the azimuth angle, for example, of the preceding traffic participant is able to be recorded, starting from the driving direction of the respective vehicle. Since functionally non-relevant objects such as manhole covers or bridges also reflect radar signals, the detection of the angle of elevation permits one to distinguish between functionally relevant and non-relevant objects.

Such a detection of the azimuth angle or angle of elevation may take place, for example, by evaluation of the phases and amplitudes of the receiving antennas of a radar system.

US document US 2012/256795 A1 shows a possible antenna for such a radar system.

For a two-dimensional antenna array having phase centers $X_i$ and $y_i$, the following equation applies for the phase on element i:

$$\varphi_i = \frac{2\pi}{\lambda}(x_i * \sin\theta * \cos\Phi + y_i * \sin\Phi)$$

where $\theta$ represents the azimuth angle and $\Phi$ the angle of elevation.

In a general two-dimensional antenna array, the azimuth angle and the angle of elevation have to be calculated jointly. Because of that, the calculating expenditure rises sharply. It is therefore desirable to decouple the calculation of the azimuth angle and the angle of elevation.

It is known to the Applicant that one should use an antenna as shown in FIG. 8, in order to enable a separate calculation of the azimuth angle and the angle of elevation for small angles of elevation ($\cos(\Phi) \approx 1$) FIG. 8 shows the positions of the receiving elements of an antenna. In this context, the four receiving elements for the calculation of the azimuth angle are situated in a horizontal plane. The two additional receiving elements for the calculation of the angle of elevation are situated in a vertical plane above the third receiving element of the horizontal plane.

However, in a separate calculation of the azimuth angle and the angle of elevation in a multi-target scenario, the angles of elevation cannot be associated with the corresponding azimuth angles.

SUMMARY

The present invention describes a method, an antenna array, a radar system, and a vehicle.

Accordingly, there is provided:

A method for detecting at least two objects, particularly using a radar system having the steps of sending out a first radio signal using a first sending device, the first sending device being situated in a horizontal plane having at least two first antenna elements, receiving the radio signal using the at least two first antenna elements, receiving the radio signal using at least two second antenna elements, which are situated in different horizontal positions each above or below corresponding first antenna elements of the horizontally situated first antenna elements, calculating respectively one azimuth angle and one angle of elevation from at least two objects located in front of the first antenna elements and the second antenna elements from the first radio signal received by the first antenna elements and from the first radio signal received by the second antenna elements, in each case one azimuth angle and one angle of elevation being assigned to one of the objects.

Furthermore, there is provided:

An antenna array, particularly for a radar system, for detecting at least two objects having at least two first antenna elements, which are situated in a horizontal direction in a plane, and which are developed to receive a first radio signal, having at least two second antenna elements, which are situated in different horizontal positions respectively above or below the horizontally situated first antenna elements, and which are developed to receive the first radio signal, having a processing device which is developed to receive the first radio signal, having a processing device which is developed to calculate one respective azimuth angle and one respective angle of elevation for each of at least two objects located in front of the antenna array, from the first radio signal received by the first antenna elements and from the first radio signal received by the second antenna elements and which respectively assign one azimuth angle and one angle of elevation to one of the objects.

Furthermore, there is provided:

A radar system having an antenna array according to the present invention and having an electronic system which is developed to generate a first signal which is sent out by the first sending device as the first radio signal, and/or to generate at least one second signal, which is sent out by the at least one second sending device as the second radio signal.

Finally, there is provided:

A vehicle, particularly a motor vehicle, having a radar system according to the present invention.

The realization on which the present invention is based is that an assignment of the angle of elevation to corresponding azimuth angles during a separate calculation of the azimuth angles and the angles of elevation is not possible if a plurality of objects is to be detected simultaneously.

Now, the idea on which the present invention is based is to take this realization into account, and to provide a possibility of calculating the azimuth angle and the angle of elevation of at least two objects simultaneously, even when the second antenna elements are not situated in a vertical straight line.

For this, the present invention provides that the first antenna elements be situated in a horizontal plane and the second antenna elements above and below the first antenna elements. In this context, the second antenna elements are not situated in a common vertical plane but are positioned in a laterally offset manner.

The present invention provides a processing device which calculates from the radio signals received by the first antenna elements and received by the second antenna elements for each object both the azimuth angle and the angle of elevation.

By displacing the second antenna elements in the horizontal direction, the present invention makes it possible to achieve a high antenna gain in the elevation direction, without thereby having to accept restrictions in the vertical distances of the second antenna elements. Consequently, good focusing is achieved in the elevation direction.

Furthermore, the present invention makes possible calculating simultaneously both the azimuth angle and the angle of elevation for at least two objects, and thereby carrying out an unequivocal assignment of angles of elevation to the corresponding azimuth angles.

In one specific embodiment, during the calculation, the respective azimuth angles and the respective angles of elevation are calculated at least based on the first radio signal received by the first antenna elements and the first radio signal received by the second antenna elements and based on a specified function of the maximum probability. This makes possible a simultaneous calculation of the azimuth angle and the angle of elevation for at least two objects.

In one specific embodiment, during the calculation of the respective angles of elevation, a correction is carried out based on respective, previously separately calculated azimuth angles. Because of that, one may do without a complete measuring of the antenna diagram according to azimuth and elevation. The measurement of one horizontal and one vertical antenna diagram section is sufficient. At the same time, the correction in connection with the antenna array makes possible carrying out an unambiguous assignment of angles of elevation to the corresponding azimuth angles.

In one specific embodiment, at least one second radio signal is sent out using a second sending device. Furthermore, during the calculation, the azimuth angle and the angle of elevation are calculated, based on the radio signals received by the first antenna elements and the radio signals received by the second antenna elements. This enables providing an antenna according to the MIMO principle, which has a larger virtual aperture, and thus makes possible a higher recording accuracy.

In one specific embodiment, the second antenna elements are each situated in a vertical direction above or below a corresponding one of the first antenna elements, the second antenna elements being situated at different heights above or below the plane of the first antenna elements. This enables placing the second antenna elements very flexibly with respect to the first antenna elements.

In one specific embodiment, at least one of the second antenna elements is situated in the vertical direction next to a corresponding one of the first antenna elements. This enables placing the second antenna elements very flexibly with respect to the first antenna elements.

In one specific embodiment, the antenna array has a first sending device, which is developed to send out the first radio signal, the first sending device being situated in the plane of the first antenna elements. This enables providing a very compact antenna array.

In one specific embodiment, the antenna array has a second sending device, which is developed to send out a second radio signal, the second sending device being situated in the plane of the first antenna elements at a different horizontal position than the first sending device, and the first antenna elements and the second antenna elements being developed to receive the second radio signal. This enables providing an antenna according to the MIMO principle, which has a larger aperture, and thus makes possible a higher accuracy.

The above embodiments and further developments may be combined with one another as desired if such a combination appears useful. Additional possible embodiments, further refinements and implementations of the present invention also include combinations of features of the present invention not explicitly mentioned above or below with regard to the exemplary embodiments. In particular, one skilled in the art will also add individual aspects as improvements or supplementations to the respective basic form of the present invention.

DETAILED DESCRIPTION

Figure 1:
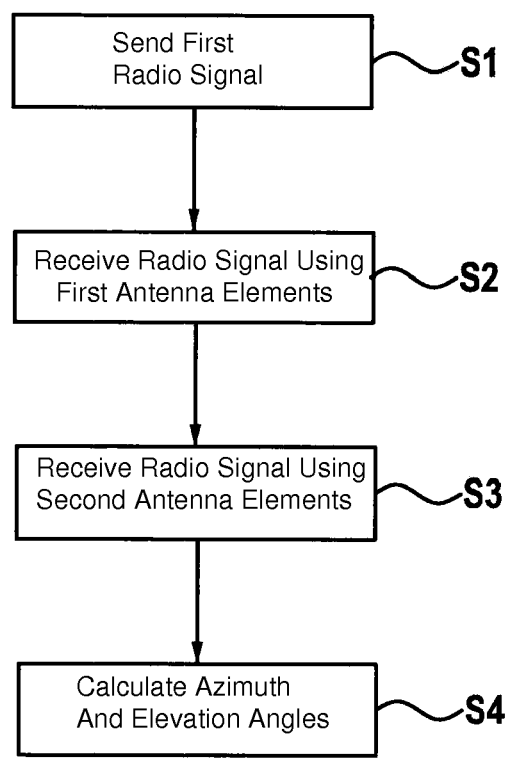
FIG. 1 a flow chart of one specific embodiment of a method according to the present invention.

Unless indicated otherwise, identical or functionally equivalent elements and devices have been provided with the same reference numerals.

Within the scope of this Patent Application, one should understand by a radar system any system which, based on electromagnetic waves, that are sent out and reradiated, is able to locate objects which reradiate the electromagnetic waves.

Within the scope of this Patent Application, one should understand by an antenna element any element which is developed to pick up electromagnetic waves and convert them to an electrical signal. For example, an antenna element may be developed as a copper surface on a circuit board. An antenna element may also be developed to be rod-shaped or the like.

Within the scope of this Patent Application, one should understand by a radio signal any electromagnetic wave that is sent out or received.

Within the scope of this Patent Application, one should understand by a processing device any electronic device which is able to carry out calculations. This may be, for instance, a microcontroller, a microprocessor, a computer, an ASIC or the like.

Within the scope of this Patent Application, formulas or calculations are explained and clarified in connection with the processing device, one should understand by this that the processing device performs these calculations at least logically. Thus, the processing device may also use another calculation process or other forms of the formulas shown, particularly for the calculation by forms optimized by digital calculation devices. For instance, the calculations shown may also be carried out using complex numbers.

Within the scope of this Patent Application, the azimuth angle represents the angle in the horizontal plane between the longitudinal axis of the radar array or of the vehicle which carries the radar array and an object to be detected.

Within the scope of this Patent Application, the angle of elevation represents the angle in the vertical plane between the longitudinal axis of the radar array or of the vehicle which carries the radar array and an object to be detected.

By a function of the maximum probability one should understand within the scope of this Patent Application a so-called Deterministic Maximum Likelihood Method. Such a function becomes a maximum if the correlation between a plurality of antenna diagrams stored for the respective antenna array and the radio signal received at its greatest.

By a vehicle, one is to understand, within the scope of this Patent Application, any type of vehicle, whether an aircraft, land vehicle or watercraft.

SPECIFIC EMBODIMENTS OF THE PRESENT INVENTION

FIG. 1 shows a flow chart of a specific embodiment of a method according to the present invention.

A first step S1 provides sending out a first radio signal 14 using a first sending device TX1, TX3, the first sending device TX1, TX3 being situated in a horizontal plane with at least two first antenna elements 1-4, 7-10.

In a second step S2, radio signal 14 is received using the at least two first antenna elements 1-4, 7-10.

In a third step S3, the radio signal is received using at least two second antenna elements 5, 6, which in different horizontal positions are each situated above or below corresponding first antenna elements 1-4, 7-10 of the horizontally situated first antenna element 1-4, 7-10.

A fourth step S4 provides the calculation each of one azimuth angle and of one angle of elevation of at least two objects 13-1, 13-2 situated in front of first antenna element 1-4, 7-10 and second antenna elements 5, 6, from first radio signal 14 received by first antenna elements 1-4, 7-10 and from first radio signal 14 received by first antenna elements 1-4, 7-10 and from radio signal 14 received by second antenna elements 5, 6, in each case one azimuth angle and one angle of elevation being assigned to an object 13-1, 13-2.

In one specific embodiment, in fourth step S4, the calculation respectively of an azimuth angle and an angle of elevation is carried out for each of objects 13-1, 13-2, based on a specified function of maximum probability, and also on the Deterministic Maximum Likelihood Function or DML Function.

For the carrying out of this calculation, various antenna diagrams are picked up before carrying out the method for a given antenna array 10. In this context, antenna diagrams are picked up for each relevant possible position of an object 13-1, 13-2 with respect to antenna array 10.

The DML function represents a correlation between the first radio signals received by first antenna elements 1-4 and one of second antenna elements 5 and 6 and the antenna diagrams picked up. In this context, the radio signals received are compared to linear combinations of the antenna diagrams picked up.

The DML-based method provided here is based on the assumption that radio signals 14 received are a linear combination of radio signals 14 reflected by objects 13-1, 13-2.

If two objects 13-1, 13-2 are to be detected, linear combinations are formed for all combinations of respectively different antenna diagrams and compared to the radio signals.

As a result, the DML function is a maximum when a corresponding linear combination of the antenna diagrams shows the best possible agreement with radio signals 14 received.

In other words, in an iterative method, the error between the respective linear combination and the radio signals received is minimized.

The two objects 13-1, 13-2 are then located at those positions at which the DML function becomes a minimum, or the error between the linear combination and radio signal 14 becomes a minimum.

As a rule, no 3D antenna diagrams are picked up but only horizontal ($\Phi=0°$) or vertical ($\theta=0°$) antenna diagram sections.

The estimate of the angle of elevation is thus to be carried out with the knowledge of $\underline{a}(\theta=0°, \Phi)=\underline{a}_{vert}(\Phi)$. In the ideal case, $\underline{a}(\theta, \Phi)$ may be decomposed into $$\underline{a}_{hor}(\theta) \odot \underline{a}_{vert}(\Phi)$$

where $\odot$ represents symbolically the element-wise multiplication.

In the two-target case, for the receive signal at the antennas, the following applies $$\underline{x} = c_1 \cdot \underline{a}(\theta_1, \Phi_1) + c_2 \cdot \underline{a}(\theta_1, \Phi_1)$$

The azimuth-dependent portion of the receive signal can no longer be simply corrected, since the correction factors are different for each target. Instead, "virtual" control vectors may be determined for the estimate of the angle of elevation at locations $\overline{\theta_1}, \overline{\theta_2}$ as follows: Each element of the only elevation-dependent control vector (i.e. of vertical antenna diagram section $a_{vert}(\Phi)$) is multiplied by the associated value at the estimated azimuth angle $\theta$ from the horizontal antenna diagram normalized to $0°$.

$$a_{virtuell,i}(\hat{\theta}_1, \phi) = \frac{a_{hor,i}(\hat{\theta}_1)}{a_{hor,i}(0°)} a_{vert,i}(\phi) \qquad (2)$$

$$a_{virtuell,i}(\hat{\theta}_2, \phi) = \frac{a_{hor,i}(\hat{\theta}_2)}{a_{hor,i}(0°)} a_{vert,i}(\phi)$$

Since, except for exactly symmetrical scenarios, the correction factors for the two targets are different, and have no special relationship, the DML function has to be evaluated for all pairs of angles $\overline{\phi}_1, \overline{\phi}_2$.

In one further specific embodiment, during the sending out S1 of radio signal 14, a second radio signal 15 may be sent out. This may particularly take place in the case of an antenna array according to the MIMO principle. In the same way, during receiving S2 by first antenna element 1-4 and during receiving S3 by second antenna elements 5 and 6, first radio signal 14 and second radio signal 15 are received.

Calculation S4 of the azimuth angle and of the angle of elevation then takes place based on first received radio signal 14 and second received radio signal 15, as was described above.

Figure 2:
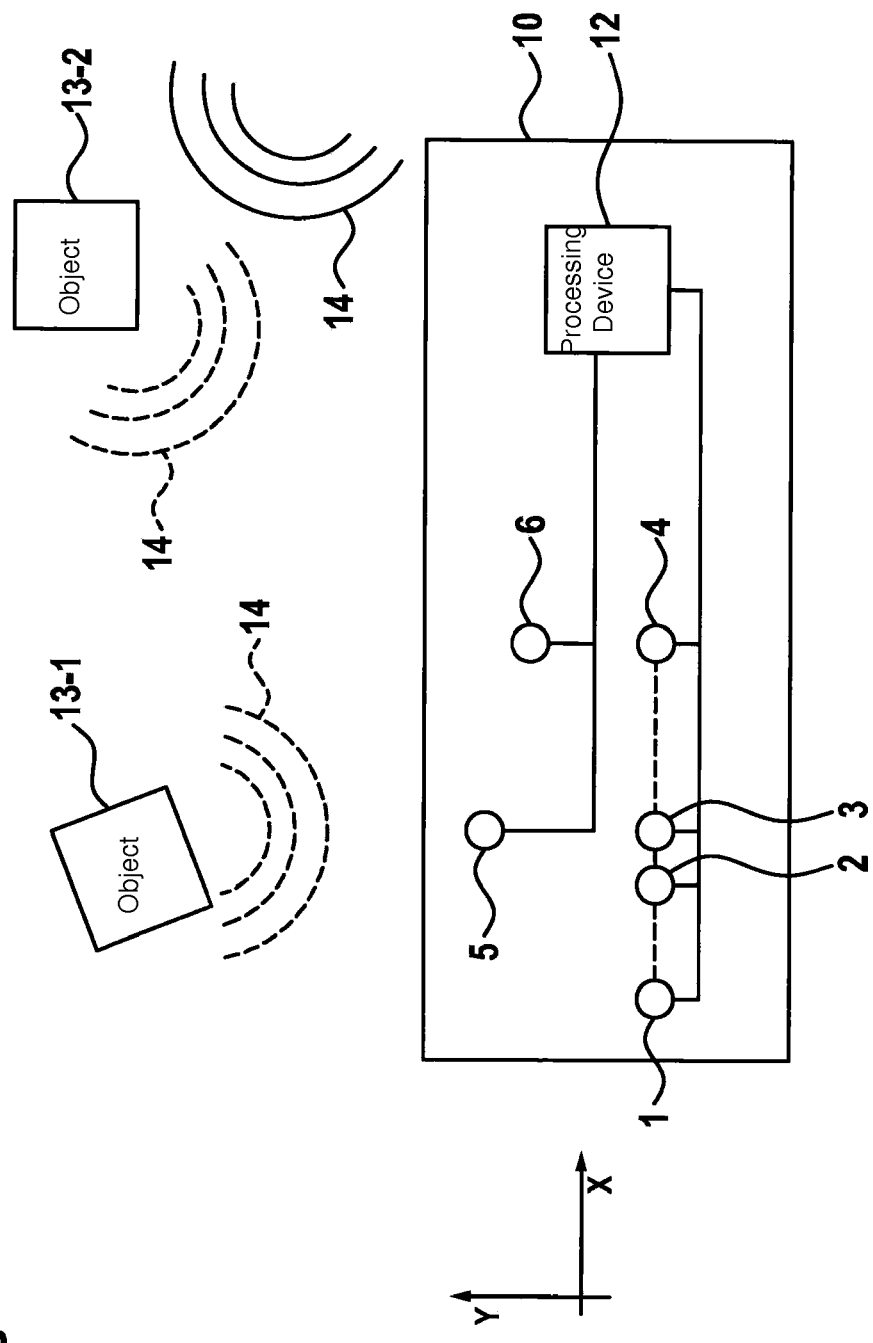
FIG. 2 a block diagram of a specific embodiment of an antenna array according to the present invention.

FIG. 2 shows a block diagram of a specific embodiment of an antenna array 10 according to the present invention.

Antenna array 10 has four first antenna elements 1-4, which are situated in the X direction, horizontally in a row. Furthermore, antenna array 10 has two second antenna elements 5 and 6. Second antenna element 5 is situated in the Y direction, vertically above third antenna element 3 and second antenna element 6 is situated in the Y direction, vertically above fourth antenna element 4.

The distance between first antenna element 1 and first antenna element 2 is approximately twice as great as the distance between second antenna element 2 and first antenna element 3. Furthermore, the distance between third antenna element 3 and fourth antenna element 4 is approximately twice as great as the distance between first antenna element 1 and the second antenna element 2.

The distance between second antenna element 5 and first antenna element 3 corresponds approximately the distance between first antenna element 3 and first antenna element 4. The distance between second antenna element 6 and first antenna element 4 corresponds approximately to the distance between first antenna element 1 and first antenna element 2. The arrangement shown here is only exemplary and may be designed differently in further specific embodiments.

The geometrical dimensions of second antenna elements 5 and 6 are so big in one specific embodiment, in this instance, that the distance between second antenna elements 5 and 6 and the corresponding first antenna elements 3 and 4 is greater than one-half the wavelength of first radio signal 14.

Furthermore, antenna array 10 has a processing device 12, which is connected to first antenna elements 1-4, and second antenna elements 5 and 6. Furthermore, in FIG. 2 a first radio signal 14 is shown, which is reflected by objects 13-1 and 13-2 in the direction of first antenna elements 1-4 and second antenna elements 5 and 6. In this context, the reflected waves of radio signal 14 are shown as dashed lines for better illustration.

Processing device 12 calculates, from radio signal 14, reflected by objects 13-1, 13-2 and received by first antenna elements 1-4 and second antenna elements 5 and 6, in each case an azimuth angle and an angle of elevation for each object 13-1, 13-2 with respect to the origin of the X-Y plane in which antenna array 10 is located. In one specific embodiment, in this context, the origin of the X-Y plane lies in the geographical middle of first antenna elements 1-4 and second antenna elements 5 and 6. As a result, the object lies in the Z direction, which is not drawn in in FIG. 1, with respect to the X-Y plane of antenna array 10.

In one specific embodiment, the processing device is developed to carry out the calculation of the azimuth angle and the angle of elevation for objects 13-1, 13-2, based on a DML function, as is explained in connection with FIG. 1.

Figure 3:
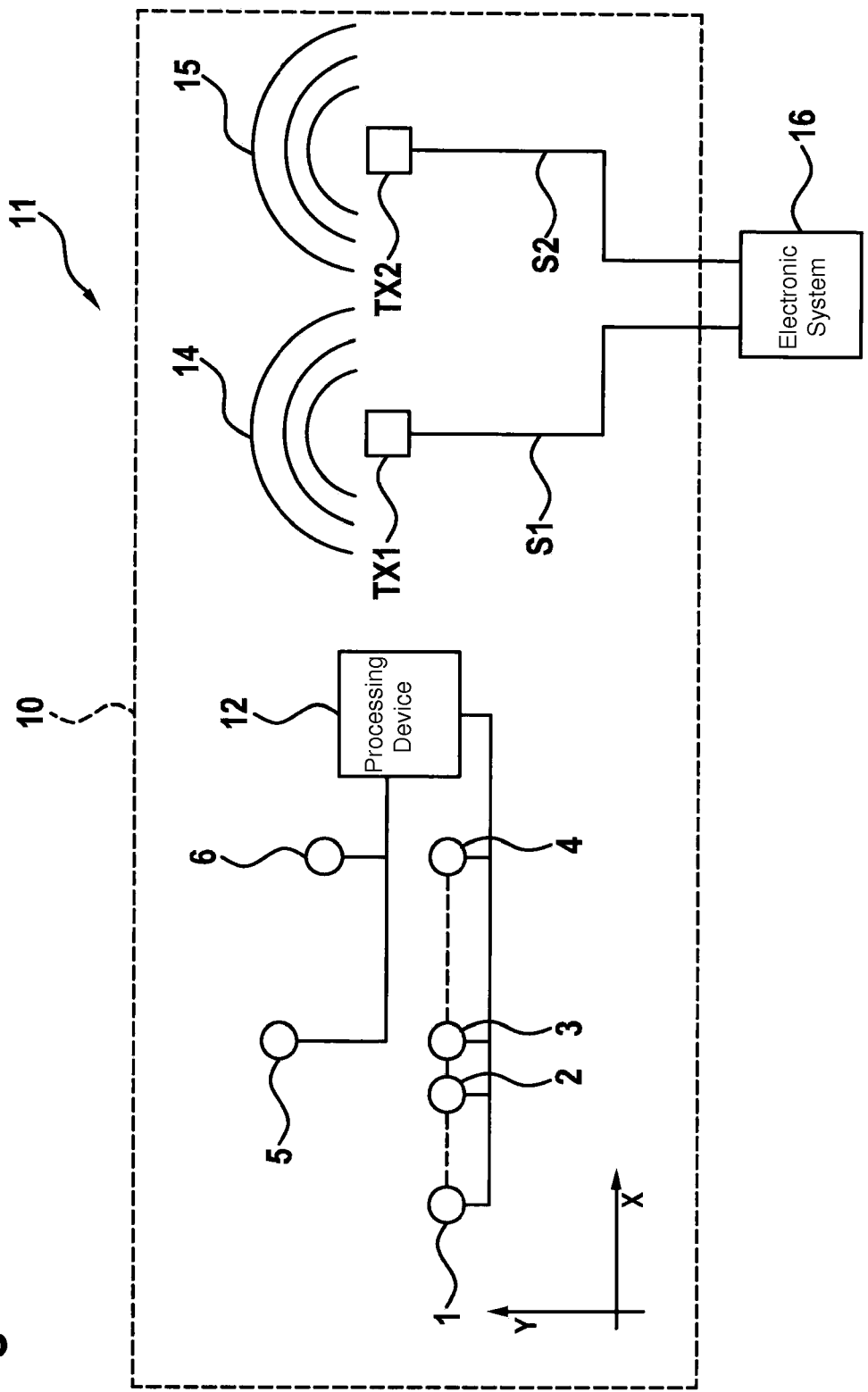
FIG. 3 a block diagram of a specific embodiment of a radar system according to the present invention.

FIG. 3 shows a block diagram of a specific embodiment of a radar system 11 according to the present invention.

Radar system 11 has an antenna array 10 that is based antenna array 10 of FIG. 2, and a first sending device TX1, as well as a second sending device TX2. In this context, first sending device TX1 sends out a first radio signal 14 and second sending device TX2 sends out a second radio signal 15.

Radar system 11 also has an electronic system 16, which generates a signal S1, S2 respectively for first sending device TX1 and for second sending device TX2 which they send out as the corresponding first radio signal 14 and the corresponding second radio signal 15.

Electronic system 16 produces a typical radar modulation, such as, for example a pulse train (Pulse-Doppler-Radar) a constant frequency (CW (continuous wave)), one or more slow linear frequency ramps (FMCW (frequency modulated continuous wave)) or many rapid frequency ramps (Chirp Sequence Modulation).

The antenna array of FIG. 3 is an antenna array according to the MIMO principle. MIMO stands for Multiple Input Multiple Output, in this instance. An antenna according to the MIMO principle has a greater aperture than a simple antenna.

Consequently, a greater accuracy may be achieved by using an antenna array 10 according to the MIMO principle.

Because of the MIMO principle, one obtains a virtual SIMO antenna system having an enlarged aperture by the sending aperture, compared to the pure receiving antenna system. In this context, the number of virtual receiving channels $N_{virt}$ scales with the number sending antennas $N_{tx}$, i.e. $N_{virt}=N_{tx}*N_{rx}$. Apart from the increased number of channels, all the calculations continue to be valid and may be transferred directly to the MIMO principle.

Figure 4:
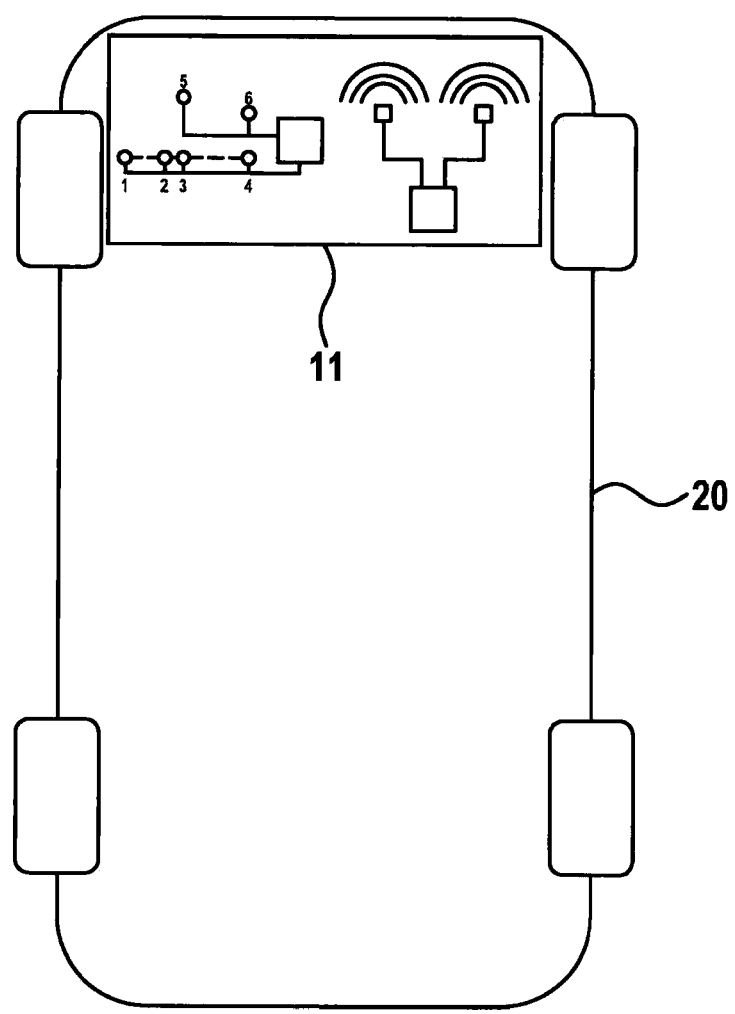
FIG. 4 a block diagram of a specific embodiment of a vehicle according to the present invention.

FIG. 4 shows a block diagram of a specific embodiment of a vehicle 20 according to the present invention.

Vehicle 20 has a single radar system 11, as shown in FIG. 3. In this context, radar system 11 is situated at the front of vehicle 20. However, in one further specific embodiment, radar system 11 may also be positioned at the rear end or at the sides of vehicle 20.

In additional specific embodiments, vehicle 20 has more than one radar system 11. For instance, vehicle 20 may have one radar system 11 which is situated at the front of vehicle 20, and one radar system 11 which is situated at the rear of vehicle 20.

Figure 5:
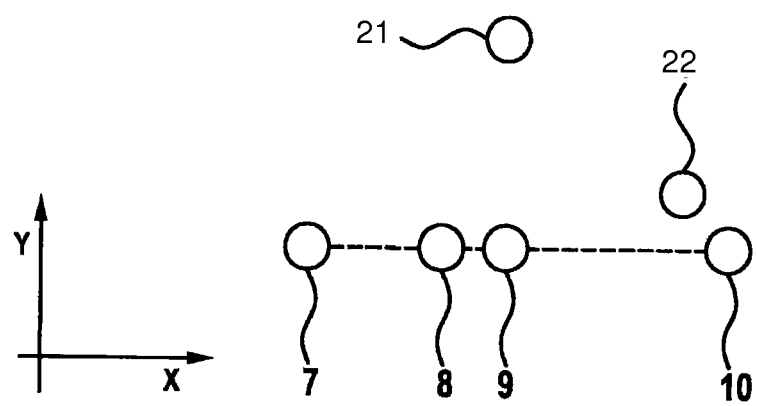
FIG. 5 a block diagram of a specific embodiment of an antenna array according to the present invention.

FIG. 5 shows a block diagram of a specific embodiment of an antenna array 10 according to the present invention.

In FIG. 5, only first antenna elements 7-10 and second antenna elements 21 and 22 are shown. The positions of first antenna elements 7-10 and second antenna elements 21 and 22 differ from the positions of first antenna element 1-4 and second antenna elements 5 and 6 of FIG. 2.

The distance between first antenna elements 7 and 8 is equal to the distance between first antenna elements 8 and 9. The distance between first antenna element 9 and first antenna element 10 is approximately as great as the distance between first antenna element 7 and first antenna element 9.

The vertical distance between second antenna element 21, which is situated above first antenna element 8, and first antenna element 8 is approximately as great as the distance between first antenna element 7 and first antenna element 9.

Second antenna element 22 is not situated directly above first antenna element 10, but is situated to the left and at an angle above first antenna element 10. The distance between second antenna element 22 and first antenna element 10 amounts approximately to one-half the distance between first antenna element 7 and first antenna element 8.

Antenna array 10 of FIG. 5 is an alternative antenna array which may also be used for the calculation of the azimuth angle and the angle of elevation of objects 13-1, 13-2.

Figure 6:
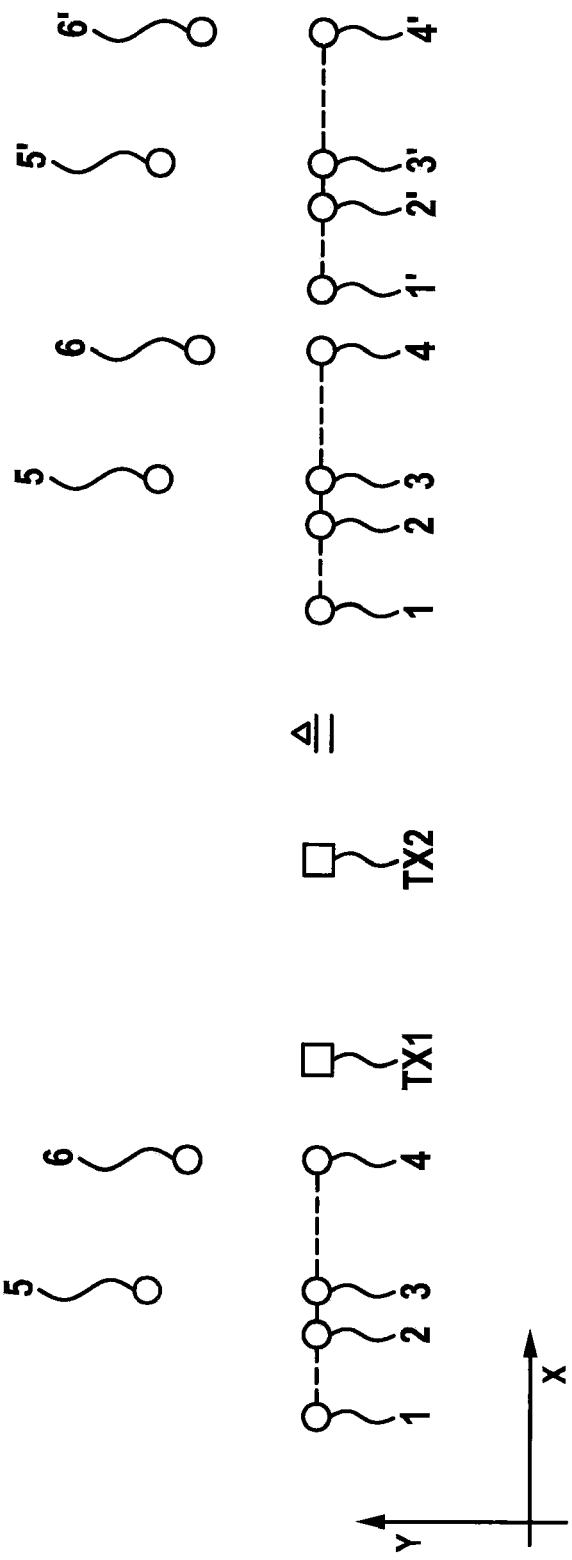
FIG. 6 a block diagram of a specific embodiment of an antenna array according to the present invention.

FIG. 6 shows a block diagram of a specific embodiment of a radar array 10 according to the present invention.

Antenna array 10 according to FIG. 6 corresponds to the antenna array of FIG. 3. In FIG. 6 only the first antenna elements 1-4, the second antenna elements 5 and 6 and first sending device TX1 and second sending device TX2 are shown. On the right side of FIG. 6 it is shown which usual antenna array 10 comes about by applying the MIMO principle. In this context, the situation described above of first antenna elements 1-4 and second antenna elements 5 and 6 is shown in duplicate. In this context, the reference numerals are shown once without a prime mark and once with. The distance of the two representations of antenna array 10 corresponds, in this case, to the distance between first sending device TX1 and second sending device TX2

Figure 7:
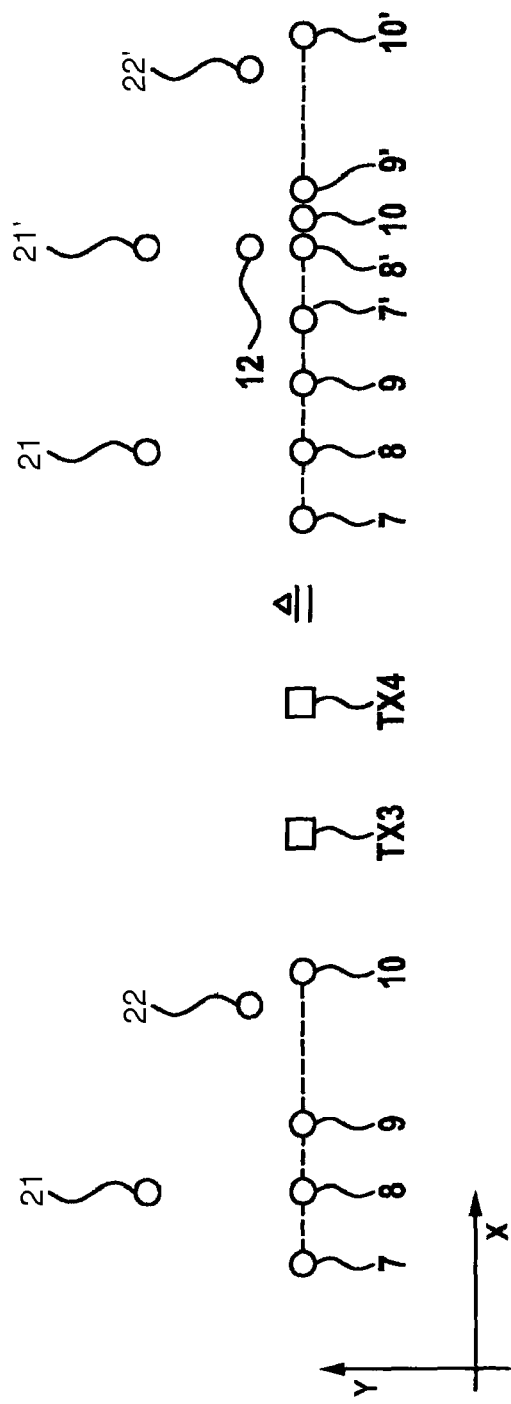
FIG. 7 a block diagram of a specific embodiment of an antenna array according to the present invention.
Figure 8:
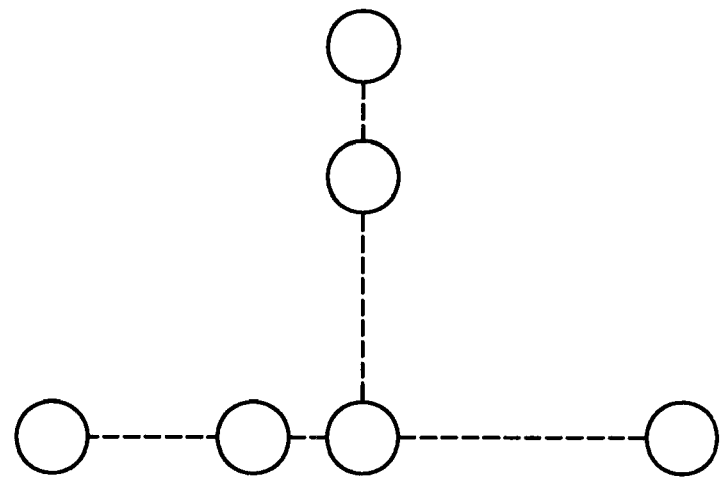
FIG. 8 a block diagram of a specific embodiment of a known antenna.

FIG. 7 shows a block diagram of a specific embodiment of a radar array 10 according to the present invention.

FIG. 7 shows for antenna array 10 of FIG. 5, in the same way as FIG. 6 does for antenna array 10 of FIG. 2, the usual antenna array 10 which comes about for the MIMO antenna of FIG. 5.

In this context, the distance between the first sending device TX3 and the second sending device TX4 is less than in the illustration of FIG. 6. Consequently, the representations of the antenna arrays on the right side of FIG. 7 overlap.

In the present description, specific antenna arrays have been described. It should be pointed out, however, that the method and the procedure, in principle, of the present invention may be carried out with a large number of different antenna arrays.

Although the present invention was described above with reference to preferred exemplary embodiments, it is not limited to these, but may be modified in numerous ways. In particular, one is able to change or modify the invention in many ways without deviating from the crux of the present invention.

What is claimed is:

1. A method for detecting at least two objects, comprising:
    sending out a first radio signal using a first sending device, the first sending device and first antenna elements of a first receiving device being situated in a same horizontal plane as each other;
    receiving the first radio signal using the first antenna elements;
    receiving the first radio signal using second antenna elements that are part of a second receiving device, wherein the second antenna elements are arranged at different horizontal positions than each other and each of the second antenna elements is arranged at a different vertical position than a vertical position of the horizontal plane; and
    calculating (a) a first azimuth angle and a first elevation angle of a first object situated in front of the first antenna elements and the second antenna elements and (b) a second azimuth angle and a second elevation angle of a second object situated in front of the first antenna elements and the second antenna elements, wherein:
        the calculating includes assigning the first azimuth angle and the first elevation angle to the first object and assigning the second azimuth angle and the second elevation angle to the second object; and
        the calculating includes calculating each of the first and second azimuth angles and each of the first and second elevation angles from both a first output signal obtained from the first receiving device and generated by the first receiving device based on the receipt of the first radio signal by the first antenna elements and a second output signal obtained from the second receiving device and generated by the second receiving device based on the receipt of the first radio signal by the second antenna elements.

2. The method as recited in claim 1, wherein the calculation of each of the first and second azimuth angles and of the first and second elevation angles is based on a maximum probability function that correlates azimuth and elevation angles to combinations of output signals of the first and second receiving devices.

3. The method as recited in claim 2, wherein the calculating of the first and second azimuth angles includes calculating first values of the first and second azimuth values and subsequently using angles of elevation to carry out a correction on the first values of the first and second azimuth angles to obtain corrected values of the first and second azimuth angles.

4. The method as recited in claim 1, further comprising sending at least one second radio signal using a second sending device and receiving the second radio signal using the first antenna elements and the second antenna elements, wherein the calculating of the first and second azimuth angles and the first and second elevation angles is further based on the receipt of the second radio signal by the first and second antenna elements.

5. An antenna array system for detecting at least two objects, the antenna array system comprising:
    a first receiving device that includes first antenna elements situated in a same horizontal plane as each other, wherein the first receiving device is configured to provide a first output signal based on receipt by the first antenna elements of a first radio signal;
    a second receiving device that includes second antenna elements that are arranged at different horizontal positions than each other and that are each arranged at a different vertical position than a vertical position of the horizontal plane, wherein the second receiving device is configured to provide a second output signal based on receipt of the first radio signal by the second antenna elements; and
    a processing device, wherein:
        the processing device is configured to:
            calculate (a) a first azimuth angle and a first elevation angle of a first object located in front of the first antenna elements and the second antenna elements and (b) a second azimuth angle and a second elevation angle of a second object located in front of the first antenna elements and the second antenna elements;
            assign the first azimuth angle and the first elevation angle to the first object; and
            assign the second azimuth angle and the second elevation angle to the second object; and
        the calculation includes calculating each of the first and second azimuth angles and each of the first and second elevation angles from both a first output signal obtained from the first receiving device and generated by the first receiving device based on the receipt of the first radio signal by the first antenna elements and a second output signal obtained from the second receiving device and generated by the second receiving device based on the receipt of the first radio signal by the second antenna elements.

6. The antenna array as recited in claim 5, wherein vertical positions of the second antenna elements differ from each other.

7. The antenna array as recited in claim 5, wherein at least one of the second antenna elements is situated at a same horizontal position as that of a corresponding one of first antenna elements.

8. The antenna array as recited in claim 5, further comprising a first sending device for sending out the first radio signal and situated in the horizontal plane.

9. The antenna array as recited in claim 8, further comprising at least one second sending device for sending out a second radio signal, wherein:
the second sending device is situated in the horizontal plane;
the first antenna elements and the second antenna elements are configured to receive the second radio signal; and
the processing device is configured to calculate the first and second azimuth angles and the first and second elevation angles of elevation further based on receipt of the second radio signal by the first and second antenna elements.

10. The antenna array as recited in claim 5, wherein the processing device is configured to calculate the first and second azimuth angles and the first and second elevation angles based on a maximum probability function that correlates azimuth and elevation angles to combinations of output signals of the first and second receiving devices.

11. The antenna array as recited in claim 10, wherein the calculation includes calculating first values of the first and second azimuth values and subsequently using angles of elevation to correct the first values of the first and second azimuth angles to obtain corrected values of the first and second azimuth angles.

12. A radar system, comprising:
an antenna array for detecting at least two objects, the antenna array comprising:
 a first receiving device that includes first antenna elements situated in a same horizontal plane as each other, wherein the first receiving device is configured to provide a first output signal based on receipt by the first antenna elements of a first radio signal; and
 a second receiving device that includes second antenna elements that are arranged at different horizontal positions than each other and that are each arranged at a different vertical position than a vertical position of the horizontal plane, wherein the second receiving device is configured to provide a second output signal based on receipt of the first radio signal by the second antenna elements;
a processing device, wherein:
 the processing device is configured to:
  calculate (a) a first azimuth angle and a first elevation angle of a first object located in front of the first antenna elements and the second antenna elements and (b) a second azimuth angle and a second elevation angle of a second object located in front of the first antenna elements and the second antenna elements;
  assign the first azimuth angle and the first elevation angle to the first object; and
  assign the second azimuth angle and the second elevation angle to the second object; and
 the calculation includes calculating each of the first and second azimuth angles and each of the first and second elevation angles from both a first output signal obtained from the first receiving device and generated by the first receiving device based on the receipt of the first radio signal by the first antenna elements and a second output signal obtained from the second receiving device and generated by the second receiving device based on the receipt of the first radio signal by the second antenna elements; and
an electronic system for generating a signal to be sent out by a sending device as the first radio.

13. A vehicle comprising a radar system, the radar system comprising:
an antenna array for detecting at least two objects, the antenna array comprising:
 a first receiving device that includes first antenna elements situated in a same horizontal plane as each other, wherein the first receiving device is configured to provide a first output signal based on receipt by the first antenna elements of a first radio signal; and
 a second receiving device that includes second antenna elements that are arranged at different horizontal positions than each other and that are each arranged at a different vertical position than a vertical position of the horizontal plane, wherein the second receiving device is configured to provide a second output signal based on receipt of the first radio signal by the second antenna elements;
a processing device, wherein:
 the processing device is configured to:
  calculate (a) a first azimuth angle and a first elevation angle of a first object located in front of the first antenna elements and the second antenna elements and (b) a second azimuth angle and a second elevation angle of a second object located in front of the first antenna elements and the second antenna elements;
  assign the first azimuth angle and the first elevation angle to the first object; and
  assign the second azimuth angle and the second elevation angle to the second object; and
 the calculation includes calculating each of the first and second azimuth angles and each of the first and second elevation angles from both a first output signal obtained from the first receiving device and generated by the first receiving device based on the receipt of the first radio signal by the first antenna elements and a second output signal obtained from the second receiving device and generated by the second receiving device based on the receipt of the first radio signal by the second antenna elements; and
an electronic system for generating a signal to be sent out by a sending device as the first radio signal.

14. The vehicle as recited in claim 13, wherein the vehicle is a motor vehicle.

15. The method as recited in claim 1, wherein the method is performed using a radar system.

16. The antenna array as recited in claim 5, wherein the antenna array is for a radar system.

* * * * *